(12) United States Patent
Nagura et al.

(10) Patent No.: US 8,708,086 B2
(45) Date of Patent: Apr. 29, 2014

(54) SADDLE-RIDE TYPE VEHICLE

(75) Inventors: Hidenori Nagura, Saitama (JP); Junichi Sakamoto, Saitama (JP); Shingo Sugiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 13/304,913

(22) Filed: Nov. 28, 2011

(65) Prior Publication Data

US 2012/0133117 A1    May 31, 2012

(30) Foreign Application Priority Data

Nov. 30, 2010    (JP) ................................ 2010-267425

(51) Int. Cl.
*B62K 11/02*    (2006.01)
*B62D 61/02*    (2006.01)

(52) U.S. Cl.
USPC ............................ 180/219; 180/218; 180/311

(58) Field of Classification Search
USPC ......... 180/90.6, 218, 219, 311; 280/781, 783, 280/798
See application file for complete search history.

(56) References Cited

U.S. PATENT DOCUMENTS

| | | | | |
|---|---|---|---|---|
| 4,768,798 A | * | 9/1988 | Reed et al. ................. | 280/281.1 |
| 4,915,188 A | * | 4/1990 | Ota et al. ..................... | 180/219 |
| 7,523,801 B2 | * | 4/2009 | Kawashima .................. | 180/219 |
| 2001/0007293 A1 | * | 7/2001 | Yamauchi ..................... | 180/219 |
| 2001/0047901 A1 | * | 12/2001 | Tsutsumikoshi ............. | 180/219 |
| 2002/0005308 A1 | * | 1/2002 | Suzuki et al. ................. | 180/219 |
| 2002/0020985 A1 | * | 2/2002 | Nakagawa .................... | 280/288 |
| 2002/0027032 A1 | * | 3/2002 | Tsutsumikoshi ............. | 180/219 |
| 2002/0029916 A1 | * | 3/2002 | Inaoka et al. ................. | 180/218 |
| 2002/0139596 A1 | * | 10/2002 | Yagisawa et al. ............. | 180/219 |
| 2002/0189877 A1 | * | 12/2002 | Yagisawa et al. ............. | 180/219 |
| 2005/0082100 A1 | * | 4/2005 | Sakaki et al. ................. | 180/219 |
| 2005/0155804 A1 | * | 7/2005 | Kamemizu et al. ........... | 180/219 |

FOREIGN PATENT DOCUMENTS

JP    2005-145203    6/2005

* cited by examiner

*Primary Examiner* — Drew Brown
*Assistant Examiner* — Barry Gooden, Jr.
(74) *Attorney, Agent, or Firm* — Rankin, Hill & Clark LLP (57) ABSTRACT

A saddle-ride type vehicle in which the body frame can be reinforced without using a special reinforcing member includes left and right rear frame portions extending rearward and upward from a down frame. The right and left rear frame portions each include a rear frame front half portion and a rear frame rear half portion that are joined together at a joint. The left and right rear frame front half portions are connected to each other by a cross frame. The rear frame rear half portions extend further forward from its joint with the rear frame front half portion and are also joined together by the cross frame, which supports a seat through a storage box.

20 Claims, 7 Drawing Sheets

SADDLE-RIDE TYPE VEHICLE

FIELD OF THE INVENTION

The present invention generally relates to saddle-ride type vehicles and, more particularly, to a frame structure of a saddle-ride type vehicle.

DESCRIPTION OF RELATED ART

JP-A No. 2005-145203 discloses a saddle-ride type vehicle having a leg passing space in front of a seat in which its body frame includes a down frame located under the leg passing space and a pair of left and right rear frames extending rearward and obliquely upward from its rear end and supporting the seat. This vehicle employs a frame structure which has a cross frame between the front portions of the pair of left and right frames curving in a way to protrude forward connecting them, and the cross frame supports the load of the seat through a storage box or luggage box.

In the frame structure according to JP-A No. 2005-145203, when the load of the seat and the cargo or carrying load of the storage box are designed to be large, it is desirable to reinforce the cross frame. Therefore, an additional reinforcing member such as, for example, a gusset plate, which is placed between the cross frame and rear frames, will be needed.

Furthermore, in the frame structure according to JP-A No. 2005-145203, the down frame and rear frame are formed using a single pipe, so the member itself is very large, posing a problem related to delivery and component storage, etc. In addition, in the frame structure according to JP-A No. 2005-145203, if the down frame and rear frame are separate members and these two frames are joined by welding, etc., there is a problem that a reinforcing member for reinforcing the above joint (between the down frame and rear frame) is needed for the load from a rear cushion.

SUMMARY OF THE INVENTION

The present invention has been made in view of the above circumstances and it is an object of the invention to provide a saddle-ride type vehicle in which the body frame can be reinforced without using a special reinforcing member.

As a means to solve the above problem, the present invention includes a saddle-ride type vehicle having a seat for an occupant to sit on, a leg passing space defined or located in front of the seat, through which the occupant passes his/her leg when getting on or off, a head pipe located in front of the leg passing space and pivotally supporting a steering system in a rotatable manner, a main frame extending rearward and downward from the head pipe, a down frame extending rearward from the main frame so as to be located under the leg passing space, left and right rear frames located behind the leg passing space, extending rearward and upward from the down frame and supporting the seat, and a cross frame connecting lower portions of the left and right rear frames and curving forward in a convex form and having support parts for supporting load of the seat. The rear frames are each constituted by joining a rear frame front half portion and a rear frame rear half portion. The cross frame connects the left and right rear frame front half portions. The rear frame rear half portions integrally have extension parts extending further forward from joints with the rear frame front half portions, and the extension parts are joined to the cross frame. As a result of this structure, the rear frame is divided into a rear frame front half portion and a rear frame rear half portion and the rear frame rear half portion extends forward from its joint with the rear frame front half portion and joins the cross frame, so the rear frame front half portion, rear frame rear half portions and cross frame form a triangle and the cross frame for supporting the seat can be reinforced without a special reinforcing member.

In further accordance with the present invention, the down frame of the saddle-ride type vehicle includes a pair of left and right down frames, and left and right down frames and the rear frame front half portions are integrated. Since the down frame and the rear frame front half portion are integrated, the number of components is decreased.

In further accordance with the invention, a saddle-ride type vehicle includes a seat for an occupant to sit on, a leg passing space defined or located in front of the seat, through which the occupant passes his/her leg when getting on or off, a head pipe located in front of the leg passing space and pivotally supporting a steering system in a rotatable manner, a main frame extending rearward and downward from the head pipe, a pair of left and right down frames extending rearward from the main frame so as to be located under the leg passing space, a pair of left and right rear frames located behind the leg passing space and extending rearward and upward from the down frame and supporting the seat, a cross frame being a frame connecting lower portions of the pair of left and right rear frames and curving forward in a convex form, a swing arm pivotally supporting a rear wheel on a rear portion thereof and being supported by the down frames or the rear frames in a vertically swingable manner, and a rear cushion unit interposed between a rear upper portion of the swing arm and rear portions of the rear frames, in which the rear frames are each constituted by joining a rear frame front half portion and a rear frame rear half portion, the down frames and the rear frame front half portions are integrated, the cross frame connects the left and right rear frame front half portions, the rear frame rear half portions integrally have extension parts extending further forward from joints with the rear frame front half portions, and the extension parts are joined to the cross frame. According to this structure, since the down frame and rear frame are separate members, the components constituting a body frame can be smaller, leading to easy delivery. In addition, since the rear frame rear half portions extend forward and join the cross frame, the body frame can be reinforced by a simple structure.

In further accordance with the present invention, the cross frame is thinner than the rear frame rear half portions and the rear frame rear half portions are formed from a metal pipe and front end portions of the extension parts of the rear frame rear half portions are oblong so as to match a thickness of the cross frame and are joined to the cross frame. Since the front end portions of the extension parts of the rear frame rear half portions are oblong, the joints with the cross frame can be larger.

In further accordance with the present invention, the seat is supported by the cross frame through a storage box and the storage box includes a battery case. As such, a heavy battery can be supported by the reinforced cross frame.

In accordance with another feature of the invention, the battery case is formed on a front side in the storage box and the cross frame supports the battery case from below. As such, it is easier to support the battery.

In further accordance with the present invention, a vehicle includes a swing unit integrally combining an engine having a cylinder protruding forward obliquely from a crankcase and a cylinder head joined to the cylinder, and a swing arm extending rearward from a lateral side of the crankcase and pivotally supporting a rear wheel on a rear portion thereof and an ignition plug of the swing unit is attached to a lateral side of the cylinder head and located under the cross frame. Since the cross frame is reinforced by the rear frame rear half portions instead of a reinforcing member under the cross frame, there is a relatively large space and it is easy to carry out maintenance including replacement of the ignition plug.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Next, an embodiment of the present invention will be described referring to drawings. In the drawings used hereinafter, arrow FR indicates the forward direction of the vehicle, arrow UP indicates the upward direction of the vehicle, and arrow LH indicates the leftward direction of the vehicle.

Figure 1:
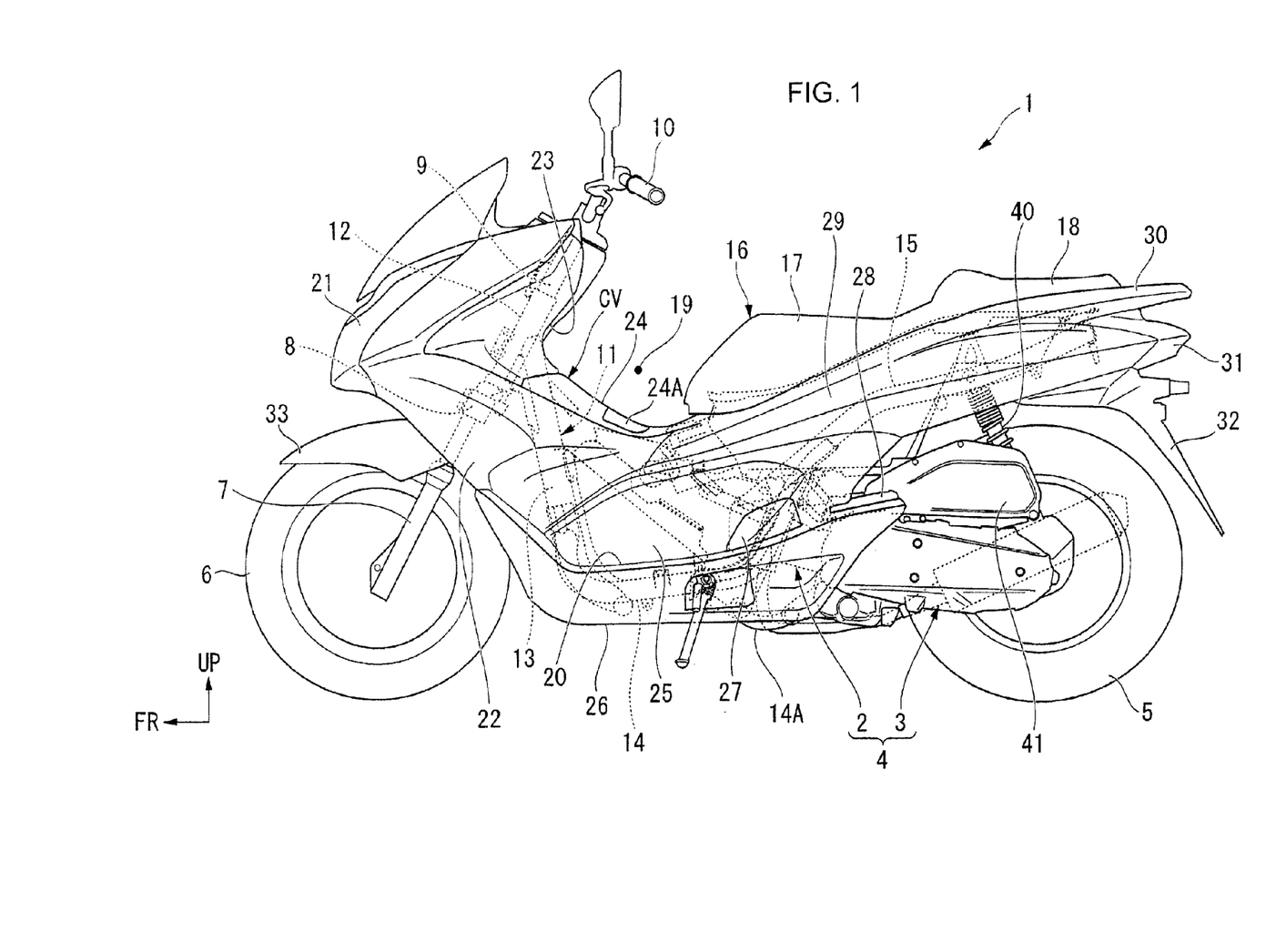
FIG. 1 is a left side view of a motorcycle according to an embodiment of the present invention.

FIG. 1 shows a scooter type motorcycle 1 according to this embodiment. The motorcycle 1 includes a swing unit 4, which combines an engine 2 and a power transmission 3. A rear wheel 5 is rotatably supported on the rear portion of the swing unit 4, and a front wheel 6, which constitutes a steering system, is located in front of the swing unit 4.

The front wheel 6 is rotatably supported on the lower portions of left and right front forks 7 and a bridge 8 is provided on the tops of the left and right front forks 7. A steering shaft 9 is standing in the center of the width direction of the bridge 8 and a steering handlebar 10 is provided on the top of the steering shaft 9. The steering shaft 9 is rotatably supported on a head pipe 12 provided at the front end of a body frame 11 comprised of a plurality of frame members integrated by welding, etc.

The body frame 11 includes: the head pipe 12; a main frame 13 extending rearward and downward from the head pipe 12; left and right side frames 14 joining the lower lateral sides of the main frame 13 and extending rearward, then extending rearward and upward; and left and right seat frames 15 joining the upper ends of the side frames 14 and extending rearward and upward.

The swing unit 4 is supported and vertically swingable on the rear lower portions of the side frames 14 through a link member 14A. Each frame is formed from a steel pipe with a hollow circular cross section. A seat 16 for an occupant to sit on is located above the swing unit 4 and the seat 16 extends longitudinally and integrally includes a main seat 17 for a rider to sit on and a pillion seat 18 for a pillion passenger to sit on.

A leg passing space 19 through which the occupant passes his/her leg when getting on or off is defined or formed in front of the seat 16 and behind the head pipe 12. The rider can get on the motorcycle 1 by passing his/her leg through the leg passing space 19, sitting on the seat 16 and putting his/her feet on left and right step floors 20 located in the lower center of the vehicle body in the longitudinal direction.

The motorcycle 1 is covered by a body cover CV comprised of a plurality of cover members made of resin material and the front upper portion of the vehicle body is covered by a front cover 21. From the lateral sides of the front cover 21, left and right front side covers 22, which are L shaped in a side view, stretch so that the front lateral sides of the vehicle body are covered by the front side covers 22.

The rear sides of the front side covers are covered by an upper inner cover 23 and a lower inner cover 24 so that the front forks 7 and steering shaft 9 are covered by the front side covers 22, upper inner cover 23 and lower inner cover 24. On the lower inner cover 24, a fuel feed hole lid 24A for opening the fuel feed hole is provided in a way that it can be opened and closed.

Left and right lower covers 25, which constitute the step floors 20, lies under the front side covers 22 and the lower covers 25 stretch up to above the swing unit 4. The lower portions of the lower covers 25 are covered by a pair of left and right under cowls 26. A lid 27 for plug maintenance that is attachable and detachable is attached to the left lower cover 25. Forwardly extending slits are formed at the rear ends of the left and right lower covers 25 and a pair of left and right pillion steps 28 on which the pillion passenger put his/her feet faces outward through the slits.

The space between the lower covers 25 and the seat 16 is covered by left and right rear side covers 29 extending rearward with their front ends stretching from the rear ends of the front side covers 22. A grab rail 30 for the pillion passenger to hold, a combination lamp 31, and a rear fender 32 are fitted to the rear portions of the rear side covers 29 sequentially from the top. The upper portion of the front wheel 6 is covered by a front fender 33.

Figure 2:
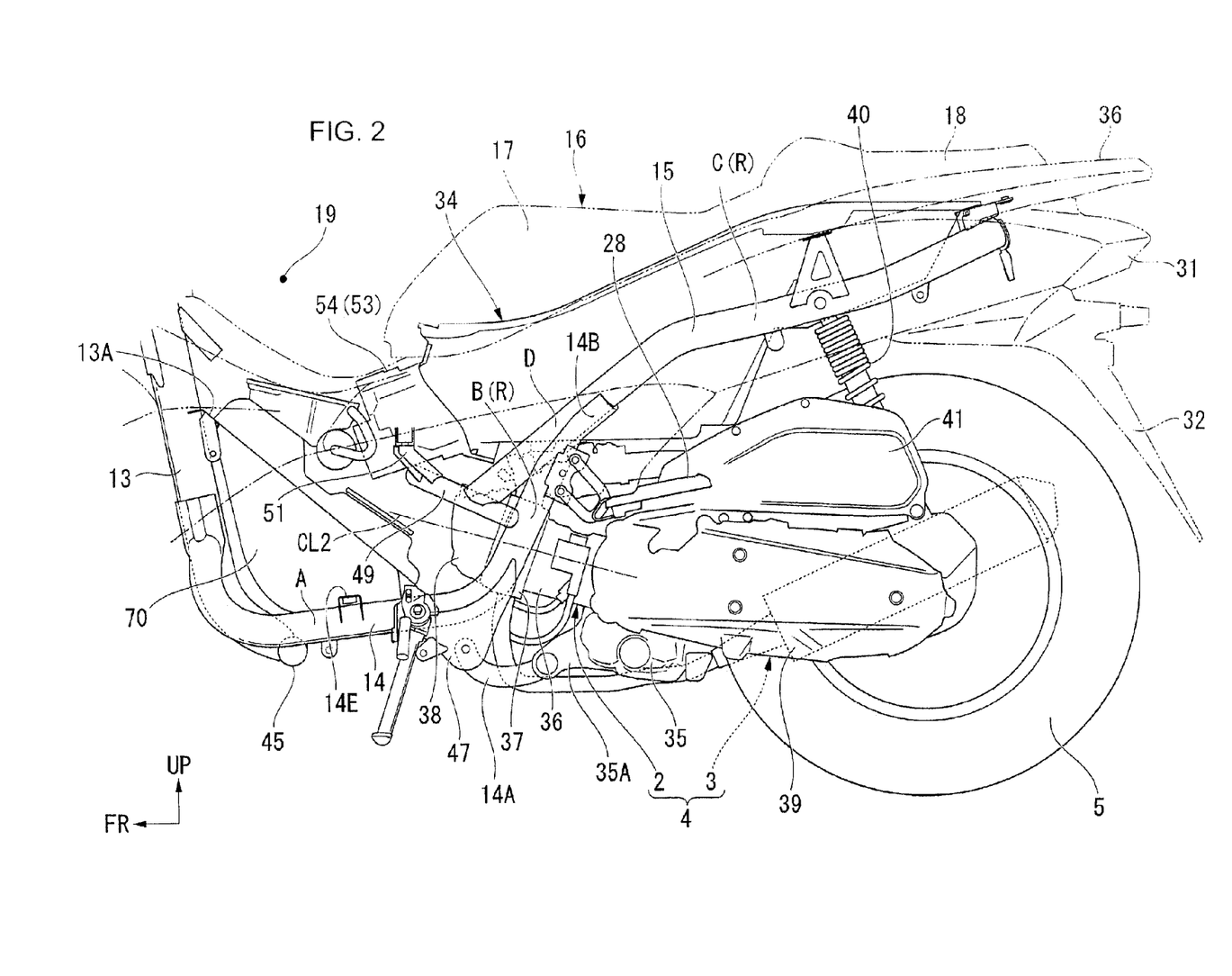
FIG. 2 is a left side view of an essential part of the motorcycle.

FIG. 2 shows a lateral side of the motorcycle 1 with the body cover CV partially removed. A storage box 34 which can house a helmet, etc. is located under the seat 16. The seat 16 is supported by the storage box 34 and the storage box 34 can be opened and closed from behind with its front end as the axis center. The storage box 34 is located between the seat frames 15 and extends rearward along the seat frames 15 and is mainly supported by the seat frames 15.

The engine 2 of the swing unit 4 includes: a crankcase 35; a cylinder 36 protruding forward obliquely from the crankcase 35; a cylinder head 37 joined to the cylinder 36; and a head cover 38 covering the cylinder head 37. The front portion of a transmission case 39 which extends rearward and also functions as a swing arm is integrally provided on the left of the crankcase 35. A belt-type continuously variable transmission mechanism in the power transmission mechanism 3 is housed in the transmission case 39 so that the driving force from the engine 2 is transmitted to the rear wheel 5 behind it.

Figure 3:
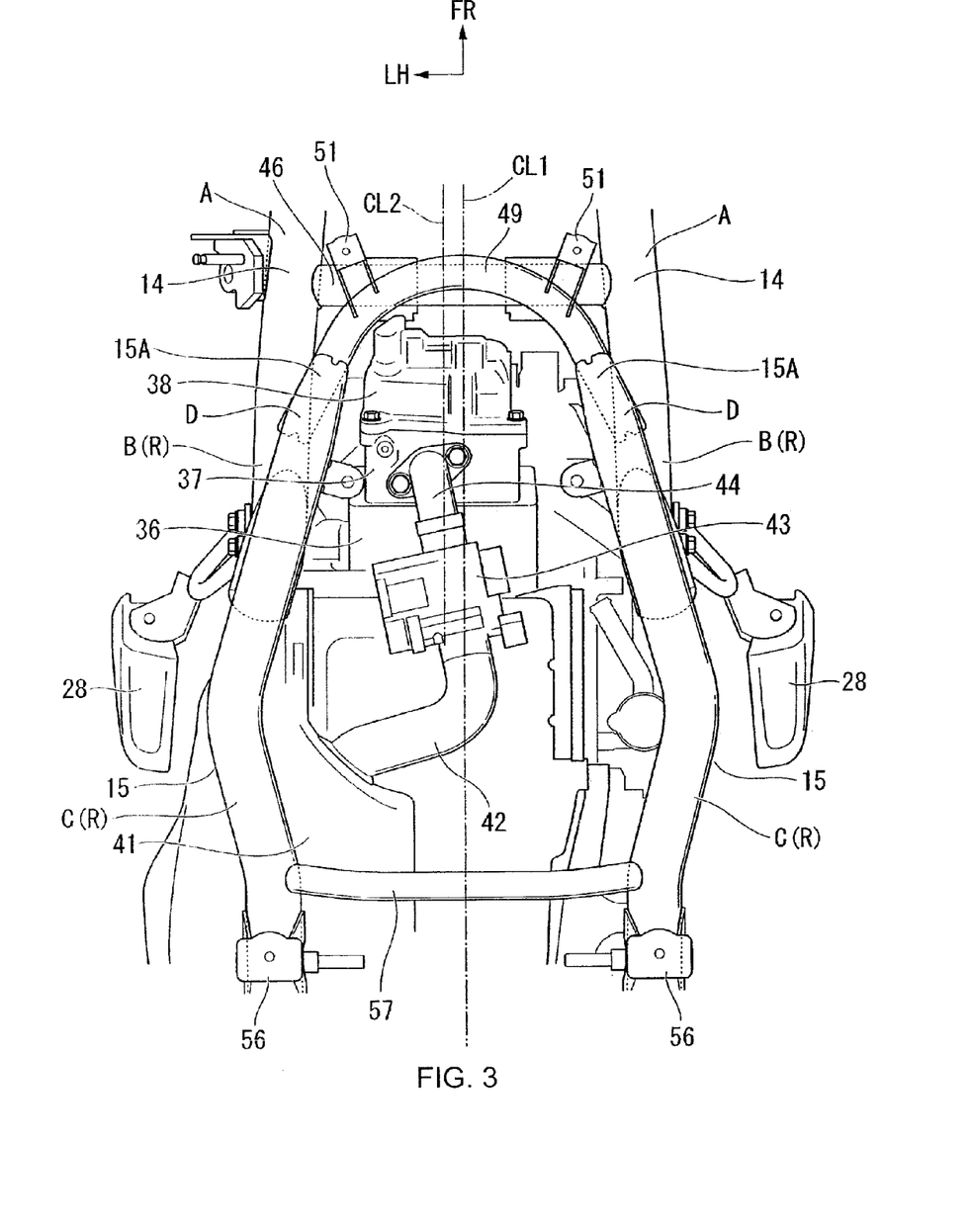
FIG. 3 is a top view of an essential part of the motorcycle.

Rear cushion units 40 are interposed between the rear top of the swing unit 4 and the rear portions of the seat frames 15 and an air cleaner 41 is provided above the swing unit 4. As shown in FIG. 3, a connecting tube 42 extending forward is connected to the air cleaner 41 and the front end of the connecting tube 42 is connected to a throttle body 43. The throttle body 43 is connected to the upper surface of the cylinder head 37 through an intake pipe 44.

In FIG. 3, CL1 represents the longitudinally extending centerline in the transverse direction of the vehicle and CL2 represents the axis line of the cylinder 36. The swing unit 4 is mounted on the vehicle body in a way that the cylinder axis line CL2 is slightly on the left of the centerline CL1. Also, as shown in FIG. 2, a coupling plate 35A, which is rotatably supported by the link member 14A, is provided integrally on the front lower portion of the crankcase 35.

Figure 4:
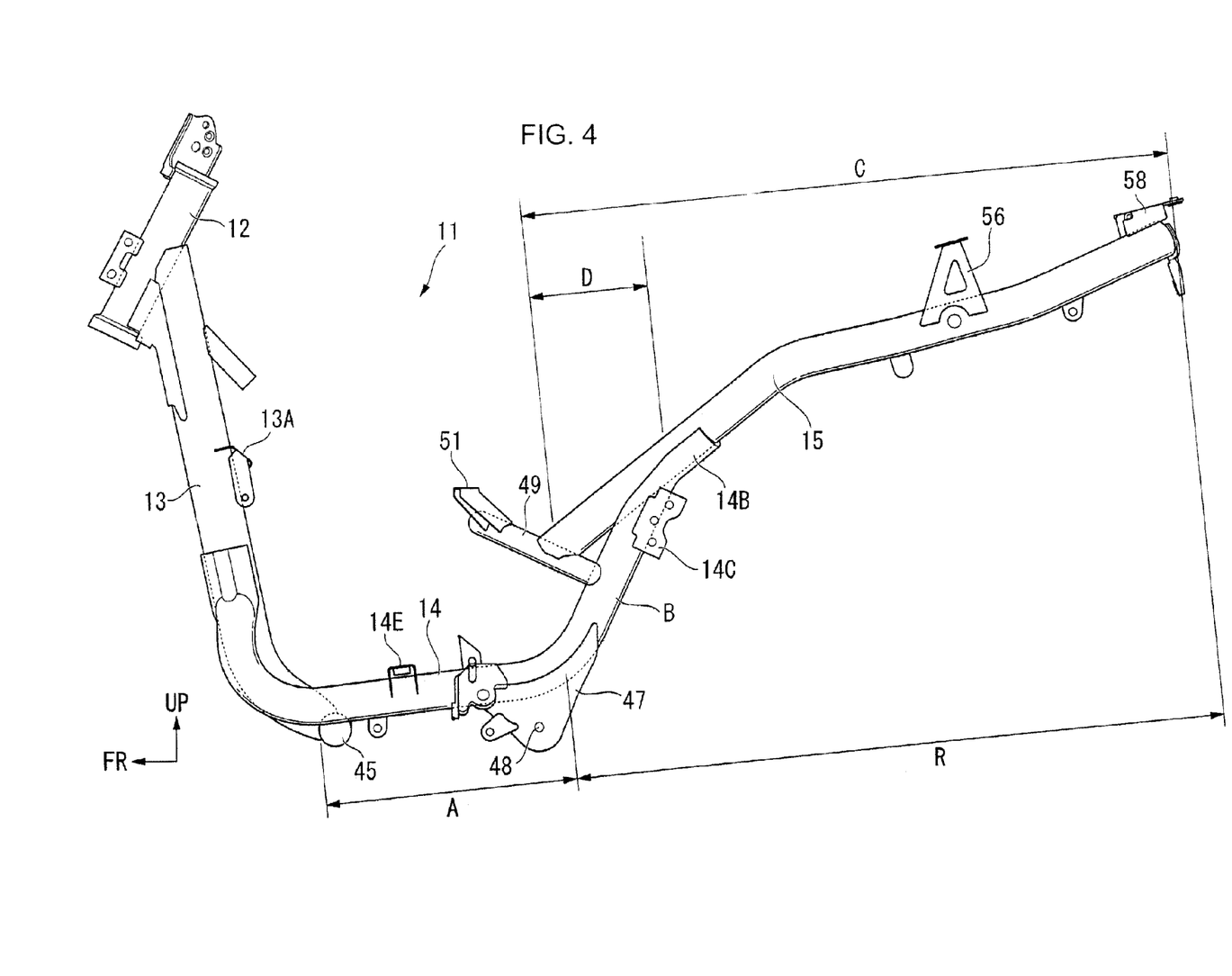
FIG. 4 is a left side view of the body frame of the motorcycle.
Figure 5:
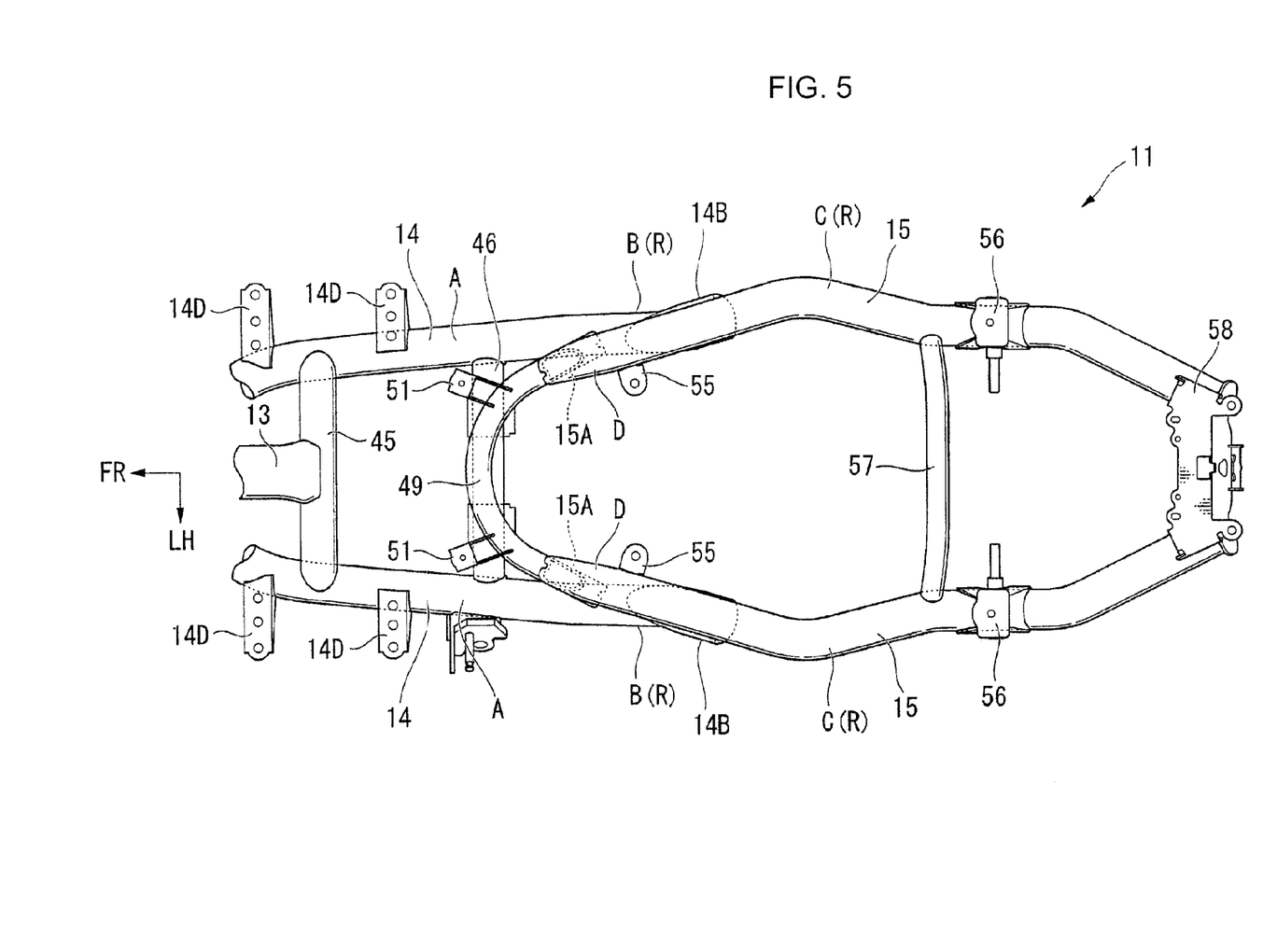
FIG. 5 is a top view of the body frame of the motorcycle.

FIGS. 4 and 5 are a left side view of the body frame 11 and a top view thereof. In the body frame 11, the main frame 13 extends further downward from the joints with the side frames 14 and has, at its rear end, a front cross frame 45 extending in the transverse direction of the vehicle to connect the side frames 14. A rear cross frame 46 bridges between the side frames 14 behind the front cross frame 45.

The side frames 14 include: down frame portions A which are located below the leg passing space 19 and extend virtually horizontally in the longitudinal direction of the vehicle; and rear frame front half portions B extending rearward and upward from the down frame portions A. Also, the seat frames 15 include rear frame rear half portions C which are joined to the upper ends of the rear frame front half portions B and extend rearward and upward.

In this embodiment, it is defined that rear frames R, extending rearward and upward from the down frame portions A, are composed of the rear frame front half portions B and rear frame rear half portions C and located behind the leg passing space 19. Next, the body frame 11 will be described in reference to the frame portion represented by the down frame portions A, rear frame front half portions B, and rear frame rear half portions C.

As shown in FIG. 4, pivot plates 47 which have a downward convex form and are almost triangular in a side view are welded to the joints between the rear ends of the down frames A and the front ends of the rear frame front half portions B and support parts 48 for supporting the link members 14A rotatably are set on the lower portions of the pivot plates 47. As shown in FIG. 5, the left and right rear frame front half portions B are connected by a cross frame 49 which curves forward in a convex form in front of the rear frame front half portions B and is U-shaped in a top view. The cross frame 49 is made of a steel pipe with a circular cross section and the ends of the cross frame 49 are joined to the rear frame front half portions B by welding.

The upper ends 14B of the rear frame front half portions B are formed so as to be semicircular in a side view and joined to the rear frame rear half portions C in a way to cover the circumferential surfaces of the lower front sides of the rear frame rear half portions C by welding (FIG. 4). The rear frame rear half portions C have extension parts D extending forward and downward from the joints with the upper ends 14B of the rear frame front half portions B and the front ends of the extension parts D are joined to the cross frame 49 by welding.

The rear frame rear half portions C are made of steel pipes with a circular cross section and the cross frame 49 is made of a thinner steel pipe than the rear frame rear half portions C (seat frames 15) and the front portions of the extension parts D are formed so that the front portions are flatter as they are closer to the cross frame 49, and as shown in FIG. 5, joints 15A where their front ends join the cross frame 49 are oblong so as to match the thickness of the cross frame 49.

Here, referring to FIGS. 2 and 3, in the motorcycle 1, the cross frame 49 extends curving forward so as to surround the lateral and front sides of the cylinder head 37 and the head cover 38 and in a top view, the front ends of the extension parts D are joined to the cross frame 49 laterally to the cylinder head 37 and head cover 38. The extension parts D are formed so that their width in the transverse direction of the vehicle gradually decreases as they come closer to the cross frame 49 and in the motorcycle 1, the clearances between the extension parts D and the cylinder head 37 are relatively large.

As shown in FIG. 4, plate members 14C for supporting the pillion steps 28 are joined to areas under the upper ends 14B of the rear frame front half portions B by welding. In addition, as shown in FIG. 5, a plurality of floor stays 14D which protrude in the transverse direction of the vehicle and support the step floors 20 from underneath are joined to the down frame portions A by welding.

A lower tank stay 14E protruding upward is provided almost in the longitudinally central area of the down frame portions A and an upper tank stay 13A is provided almost in the vertically central area of the main frame 13. The line connecting the upper tank stay 13A and lower tank stay 14E, main frame 13 and side frame 14 forms a triangular space in a side view. As shown in FIG. 2, a fuel tank 70, which is triangular in a side view, is received in this space and fixed by the upper tank stays 13A and lower tank stays 14E. The fuel tank 70 is located under the leg passing space 19 and covered by the body cover CV with its fuel feed hole facing outward through the fuel feed hole lid 24A of the lower inner cover 24 (see FIG. 1).

Figure 6:
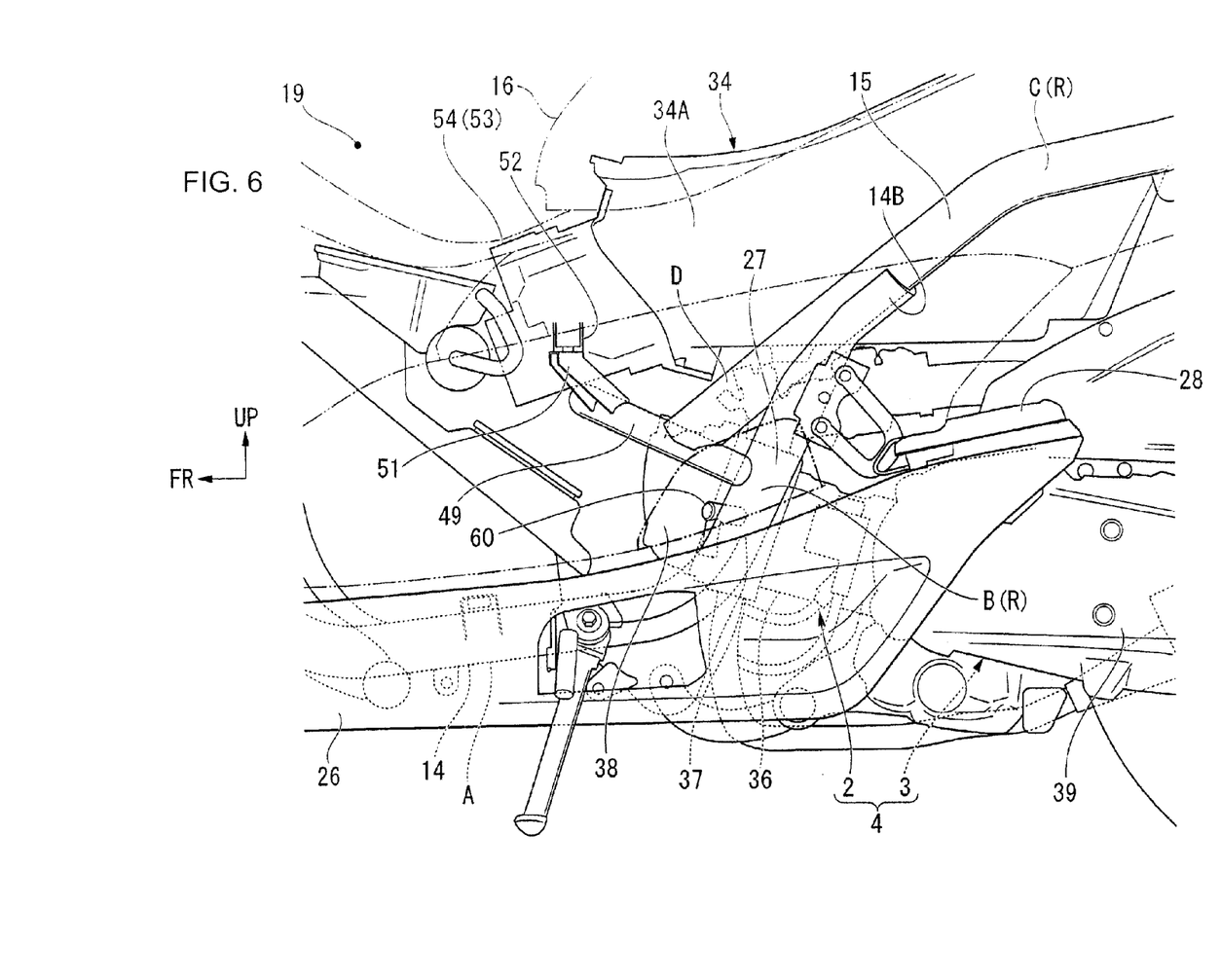
FIG. 6 is a left side view of an essential part of the motorcycle.

Referring back to FIGS. 4 and 5, support stays 51 as a pair of left and right supporting parts protruding forward and obliquely upward are joined to the cross frame 49 by welding and as shown in FIG. 2, these support stays 51 support the front of the storage box from under and support the loads of the storage box 34 and seat 16. Here, as shown in FIG. 6, the support stays 51 support, from under, a pair of left and right plate-like fixing parts 52 protruding from the front lateral sides of the storage box 34 outward in the transverse direction of the vehicle.

The storage box 34 has a battery case 54 for receiving or housing a battery 53 at its front side and this battery case 54 forms a space separate from the main storage space 34A of the storage box 34 located just below the seat 16, and protrudes forward from the front outer wall of the main storage space 34A. In this embodiment, the pair of left and right fixing parts 52 protrudes from both the lateral sides of the battery case 54 and the support stays 51 support the battery case 54 from underneath. The battery case 53 is bolted to the front outer wall of the main storage space 34A; however, alternatively they may be integrated with each other.

On the other hand, referring to FIG. 5, left and right front storage box supporting brackets 55, which protrude inward in the transverse direction of the vehicle, are joined to the rear frame rear half portions C at their front sides by welding. Behind the front storage box supporting brackets 55, left and right rear storage box supporting brackets 56 are joined by welding. Also, a front cross frame 57 and a rear cross frame 58 bridge between the left and right rear frame rear half portions C. In a top view, the front cross frame 57 is located almost in the center of the longitudinal direction of the rear frame rear half portions C and the rear cross frame 58 is located at the rear ends of the rear frame rear half portions C. A fixing part for fixing the rear fender 32, etc. is formed on the cross frame 58.

The motorcycle 1 has the abovementioned body frame 11 and in this body frame 11, the rear frames R are comprised of the rear frame front half portions B with the cross frame 49 bridging between them and the rear frame rear half portions C extending rearward and upward from the rear frame front half portions B and the rear frame rear half portions C extend forward in a way to diverge from the joints with the rear frame front half portions B and are joined to the cross frame 49. Consequently, a triangular frame portion is formed by the rear frame front half portions B, rear frame rear half portions C, and cross frame 49.

Figure 7:
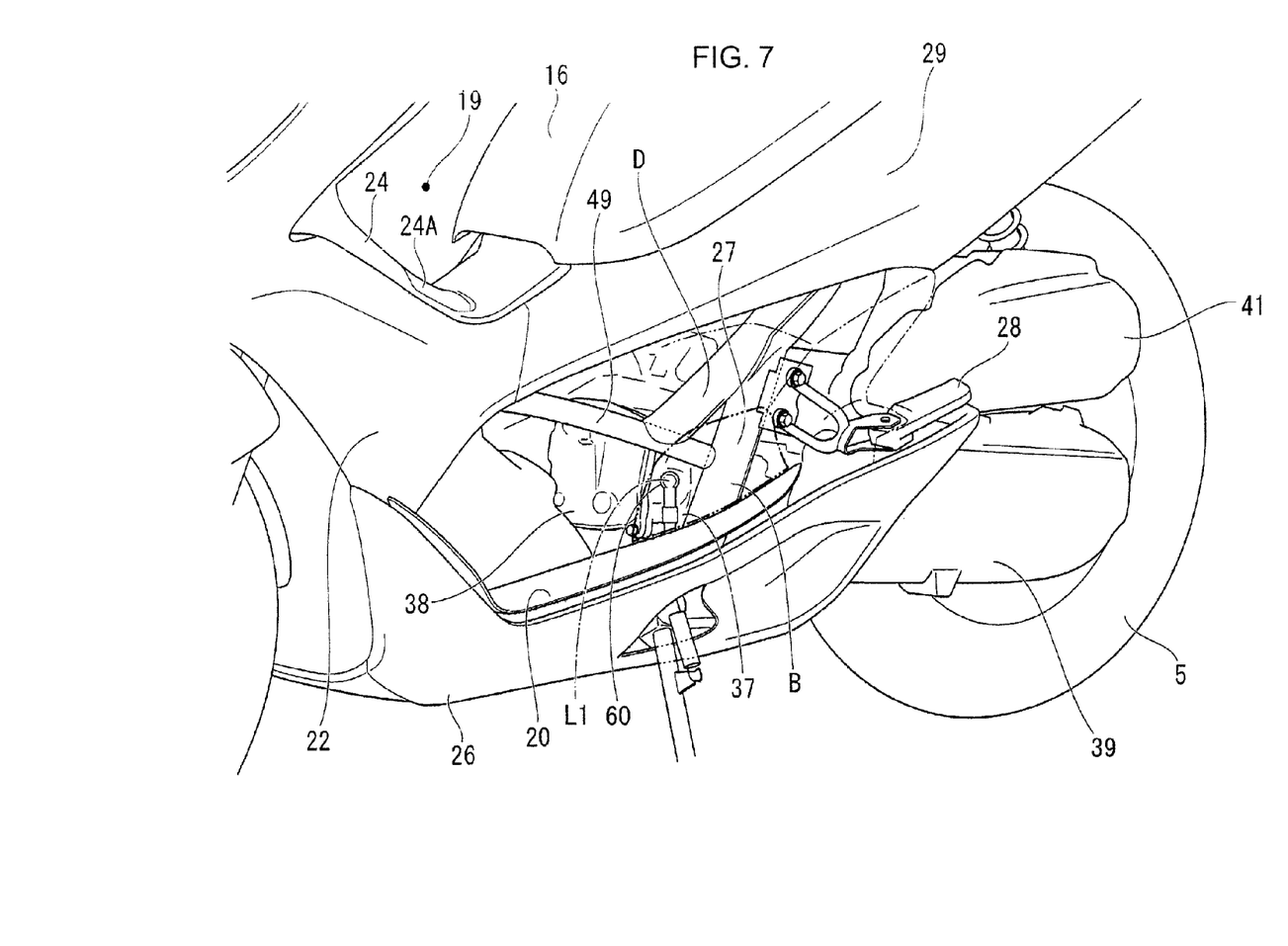
FIG. 7 is a perspective view of an essential part of the motorcycle.

Next, referring to FIGS. 6 and 7, the positional relationship between the cross frame 49 and an ignition plug 60 fitted to the cylinder head 37 is explained: the ignition plug 60 is fitted on the left lateral side of the cylinder head 37 so that its axis lies along a forward and transversely outward direction and the ignition plug 60 is located under the cross frame 49. FIG. 7 is a perspective view of the motorcycle 1 as seen from ahead and above along axis line L1 of the ignition plug 60 and in FIGS. 6 and 7, the lid 27 for plug maintenance, as mentioned earlier, which can be attached and detached is indicated by bold chain double-dashed line for illustrative convenience.

In the motorcycle 1, as these figures illustrate, the ignition plug 60 is located under the cross frame 49 and its outer side is covered by the attachable and detachable lid 27 for plug maintenance, located on the lower cover 25. Consequently, the mechanic can remove the lid 27 for plug maintenance and pass his/her hand under the cross frame 49 to access the ignition plug 60.

In the motorcycle 1 as described so far, as mentioned above, the rear frames R extending rearward and upward from the down frame portions A are divided into rear frame front half portions B and rear frame rear half portions C and the rear frame rear half portions C extend forward from the joints with the rear frame front half portions B to join the cross frame 49, so that the rear frame front half portions B, rear frame rear half portions C, and cross frame 49 form a triangle. In this motorcycle 1, due to this frame structure, the cross frame 49 can be reinforced without a special reinforcing member. Furthermore, the joint between the rear frame front half portion B and the rear frame rear half portion C which receives the load from the rear cushion unit 40 can be reinforced by a simple structure.

Furthermore, in the motorcycle 1, the cross frame 49 is thinner than the rear frame rear half portions C and the front ends of the extension parts D of the rear frame rear half portions C, namely the joints 15A with the cross frame 49 are oblong. According to this constitution, by increasing the size or area of the joints of the extension parts D with the cross frame 49, a sufficient weld length can be obtained to ensure a firm coupling between the members.

In the motorcycle 1, the down frame portions A and the rear frame front half portions B are integrated as single members (side frames 15) and in this case, the number of components is decreased.

Furthermore, in the motorcycle 1, the cross frame 49 supports the storage box 34 and the storage box 34 houses the battery 53. According to this constitution, the heavy battery 53 can be stably supported by the reinforced cross frame 49. In addition, since the cross frame 49 supports the battery case 53 housing the battery 53 from underneath, the battery 53 is supported with high stability.

In addition, in the motorcycle 1, there is a relatively large space under the cross frame 49 and the ignition plug 60 is located under the cross frame 49, so it is easy to carry out maintenance including replacement of the ignition plug 60.

The embodiment of the present invention has been described so far but the present invention is not limited to the above embodiment. For example, in the above embodiment the virtually horizontal portions of the pair of left and right side frames 14 correspond to the down frames according to the present invention; however, instead, the main frame 13 in the above embodiment may extend rearward and downward then extend rearward almost horizontally with the pair of left and right rear frames according to the present invention extending from its rear end, which also falls within the concept of the present invention.

Furthermore, the above embodiment illustrates an example in which a part corresponding to the down frame according to the present invention and a part corresponding to the rear frame front half portion according to the present invention are integrated as a single member; however, instead, the down frame and the rear frame front half portion may be separate members with the rear frame front half portion being joined to the rear end of the down frame and extending rearward and upward from it, which also falls within the concept of the present invention. Furthermore, the above embodiment illustrates an example in which a rear frame front half portion and a rear frame rear half portion according to the present invention are separate members and joined to each other by welding; however, instead, these may be combined into a single member, which also falls within the concept of the present invention. The steering system of the motorcycle as a saddle-ride type vehicle is comprised of the front wheel 6, front fork 7, bridge 8, steering shaft 9, and steering handlebar 10 in the embodiment. Also, the swing arm according to the present invention is comprised of such members as the crankcase 35 and transmission case 39.

The above embodiment illustrates an example in which the rear frames R and cross frame 49 are made of steel pipes; however, the present invention is not limited to the use of steel pipes for them; alternatively they may be tubular members of metal such as aluminum alloy or titanium alloy.

List of Reference Numbers

1 Motorcycle (saddle-ride type vehicle)
7 . . . Front fork (steering system)
12 . . . Head pipe
13 . . . Main frame
16 . . . Seat
19 . . . Leg passing space
34 . . . Storage box
54 . . . Battery case
49 . . . Cross frame
51 . . . Support stay (support part)
60 . . . ignition plug
A . . . Down frame portion (down frame)
B . . . Rear frame front half portion
C . . . Rear frame rear half portion
D . . . Extension part
R . . . Rear frame

What is claimed is:

1. A saddle-ride vehicle comprising:
a seat for an occupant to sit on;
a leg passing space located in front of the seat, through which the occupant may pass his/her leg when getting on or off;
a head pipe located in front of the leg passing space, pivotally supporting a steering system in a rotatable manner;
a main frame extending rearward and downward from the head pipe;
a down frame extending rearward from the main frame so as to be located under the leg passing space;
left and right rear frames located behind the leg passing space, said left and right rear frames extending rearward and upward from the down frame and supporting the seat; and
a cross frame directly connecting lower portions of the left and right rear frames, said cross frame curving forward in a convex form and having support parts for supporting a load of the seat,
wherein each of the right and left rear frames comprise a rear frame front half portion and a rear frame rear half portion, said right rear frame front half portion being directly joined to said right rear frame rear half portion at a right joint and said left rear frame front half portion being directly joined to said left rear frame rear half portion at a left joint;

the cross frame directly connects the left and right rear frame front half portions;

the left rear frame rear half portion integrally having an extension part that extends forward from the left joint;

the right rear frame rear half portion integrally having an extension part that extends forward from the right joint; and the extension parts are directly joined to the cross frame.

2. The saddle-ride vehicle according to claim 1, wherein the seat is supported by the cross frame through a storage box; and the storage box includes a battery case.

3. The saddle-ride vehicle according to claim 1, comprising a swing unit integrally combining an engine having a cylinder protruding forward obliquely from a crankcase and a cylinder head joined to the cylinder, and a swing arm extending rearward from a lateral side of the crankcase and pivotally supporting a rear wheel on a rear portion thereof, wherein an ignition plug of the swing unit is attached to a lateral side of the cylinder head and is located under the cross frame.

4. The saddle-ride vehicle according to claim 1, wherein said cross frame has a right end directly connected to the lower portion of said right rear frame and a left end directly connected to the lower portion of said left rear frame, and wherein forward ends of said extension parts are directly joined to the cross frame at locations intermediate the right and left ends of the cross frames.

5. The saddle-ride vehicle according to claim 1, wherein the cross frame is thinner than the left and right rear frame rear half portions; and the rear frame rear half portions are formed from a metal pipe and front end portions of the extension parts of the rear frame rear half portions are oblong so as to match a thickness of the cross frame and are joined to the cross frame.

6. The saddle-ride vehicle according to claim 5, wherein the seat is supported by the cross frame through a storage box; and the storage box includes a battery case.

7. The saddle-ride vehicle according to claim 5, comprising a swing unit integrally combining an engine having a cylinder protruding forward obliquely from a crankcase and a cylinder head joined to the cylinder, and a swing arm extending rearward from a lateral side of the crankcase and pivotally supporting a rear wheel on a rear portion thereof, wherein an ignition plug of the swing unit is attached to a lateral side of the cylinder head and is located under the cross frame.

8. The saddle-ride vehicle according to claim 1, wherein the down frame comprises left and right down frames, said left down frame being integrated with the left rear frame front half portion and the right down frame being integrated with the right rear frame front half portion.

9. The saddle-ride vehicle according to claim 8, wherein the seat is supported by the cross frame through a storage box; and the storage box includes a battery case.

10. The saddle-ride vehicle according to claim 8, comprising a swing unit integrally combining an engine having a cylinder protruding forward obliquely from a crankcase and a cylinder head joined to the cylinder, and a swing arm extending rearward from a lateral side of the crankcase and pivotally supporting a rear wheel on a rear portion thereof, wherein an ignition plug of the swing unit is attached to a lateral side of the cylinder head and is located under the cross frame.

11. The saddle-ride vehicle according to claim 8, wherein the cross frame is thinner than the left and right rear frame rear half portions; and the rear frame rear half portions are formed from a metal pipe and front end portions of the extension parts of the rear frame rear half portions are oblong so as to match a thickness of the cross frame and are joined to the cross frame.

12. The saddle-ride vehicle type vehicle according to claim 11, wherein the seat is supported by the cross frame through a storage box; and the storage box includes a battery case.

13. The saddle-ride vehicle according to claim 11, comprising a swing unit integrally combining an engine having a cylinder protruding forward obliquely from a crankcase and a cylinder head joined to the cylinder, and a swing arm extending rearward from a lateral side of the crankcase and pivotally supporting a rear wheel on a rear portion thereof, wherein an ignition plug of the swing unit is attached to a lateral side of the cylinder head and is located under the cross frame.

14. A saddle-ride vehicle comprising:

a seat for an occupant to sit on;

a leg passing space located in front of the seat and through which the occupant may pass his/her leg when getting on or off;

a head pipe located in front of the leg passing space, said head pipe pivotally supporting a steering system in a rotatable manner;

a main frame extending rearward and downward from the head pipe;

left and right down frames extending rearward from the main frame so as to be located under the leg passing space;

left and right rear frames located behind the leg passing space, said left and right rear frames extending rearward and upward from the left and right down frames, respectively, and supporting the seat;

a cross frame directly connecting lower portions of the left and right rear frames, said cross frame curving forward in a convex form;

a swing arm pivotally supporting a rear wheel on a rear portion thereof and being supported by one of the down frames and the rear frames in a vertically swingable manner; and a rear cushion unit interposed between a rear upper portion of the swing arm and rear portions of the rear frames, wherein the right rear frame comprises a right rear frame front half portion and a right rear frame rear half portion that are directly joined together at a right joint;

the left rear frame comprises a left rear frame front half portion and a left rear frame rear half portion that are directly joined together at a left joint;

the right down frame is integrated with the right rear frame front half portion; the left down frame is integrated with the left rear frame front half portion;

the cross frame directly connects the left front frame front half portion to the right rear frame front half portion;

the right rear frame rear half portion integrally includes a right extension part that extends forward from the right joint;

the left rear frame rear half portion integrally includes a left extension part that extends forward from the left joint; and the left and right extension parts are directly joined to the cross frame.

15. The saddle-ride vehicle according to claim 14, wherein the seat is supported by the cross frame through a storage box; and the storage box includes a battery case.

16. The saddle-ride vehicle according to claim 14, comprising a swing unit integrally combining an engine having a cylinder protruding forward obliquely from a crankcase and a cylinder head joined to the cylinder, and a swing arm extending rearward from a lateral side of the crankcase and pivotally supporting a rear wheel on a rear portion thereof, wherein an ignition plug of the swing unit is attached to a lateral side of the cylinder head and is located under the cross frame.

17. The saddle-ride vehicle according to claim 14, wherein said cross frame has a right end directly connected to the lower portion of said right rear frame and a left end directly connected to the lower portion of said left rear frame, and wherein forward ends of said extension parts are directly joined to the cross frame at locations intermediate the right and left ends of the cross frames.

18. The saddle-ride vehicle type vehicle according to claim 14, wherein the cross frame is thinner than the left and right rear frame rear half portions; and the rear frame rear half portions are formed from a metal pipe and front end portions of the extension parts of the rear frame rear half portions are oblong so as to match a thickness of the cross frame and are joined to the cross frame.

19. The saddle-ride vehicle according to claim 18, wherein the seat is supported by the cross frame through a storage box; and the storage box includes a battery case.

20. The saddle-ride vehicle according to claim 18, comprising a swing unit integrally combining an engine having a cylinder protruding forward obliquely from a crankcase and a cylinder head joined to the cylinder, and a swing arm extending rearward from a lateral side of the crankcase and pivotally supporting a rear wheel on a rear portion thereof, wherein an ignition plug of the swing unit is attached to a lateral side of the cylinder head and is located under the cross frame.

* * * * *